United States Patent [19]

Matsugi et al.

[11] Patent Number: 5,667,758
[45] Date of Patent: Sep. 16, 1997

[54] PROCESSING VESSEL

[75] Inventors: Nobuo Matsugi, Toyo; Haruyuki Nishimi, Niihama, both of Japan

[73] Assignee: Sumitomo Heavy Industries, Ltd., Tokyo, Japan

[21] Appl. No.: 720,072

[22] Filed: Sep. 27, 1996

Related U.S. Application Data

[63] Continuation of Ser. No. 356,536, Dec. 15, 1994, abandoned.

[30] Foreign Application Priority Data

Dec. 27, 1993 [JP] Japan ................ 5-353856

[51] Int. Cl.$^6$ .................... F28D 7/00; B01J 3/00
[52] U.S. Cl. .................. 422/198; 422/200; 422/208; 422/242; 165/156; 165/169; 220/585
[58] Field of Search ................ 422/110, 111, 422/112, 114, 198, 200, 208, 242, 109; 220/585, 426, 464, 469; 165/83, 156, 169

[56] References Cited

U.S. PATENT DOCUMENTS

| 1,911,608 | 5/1933 | Davis et al. | 220/585 |
| 2,131,753 | 10/1938 | Reid | 220/585 |
| 3,282,459 | 11/1966 | Wilson | 220/585 |
| 3,801,288 | 4/1974 | Leas et al. | 422/200 |
| 4,552,724 | 11/1985 | Matsumoto et al. | 422/138 |

FOREIGN PATENT DOCUMENTS

| 0228433 | 10/1959 | Australia | 220/585 |
| 1205978 | 2/1960 | France . | |
| 2 473 902 | 7/1981 | France . | |
| 57-147502 | 9/1982 | Japan . | |
| 2 022 454 | 12/1979 | United Kingdom . | |

OTHER PUBLICATIONS

Abstract of Japanese Patent Publ. No. JP59180290, dated Oct. 13, 1984.

Abstract of Japanese Patent Publ. No. 1-274837(A), dated Nov. 2, 1989.

Primary Examiner—Christopher Kim
Attorney, Agent, or Firm—Nikaido, Marmelstein, Murray & Oram LLP

[57] ABSTRACT

A processing vessel in which a temperature control element defining a helical flow passage, disposed on an outer surface of an inner barrel within the processing vessel. The barrel contains a processing liquid and a heating or cooling temperature control medium is caused to flow through the flow passage. The inner barrel and temperature control element are disposed in a vessel body to define a chamber between the temperature control element and an inner surface of the vessel body. The chamber defined between the vessel body and the temperature control element is a closed chamber. Preferably, a system for generally equalizing the pressures in the inner barrel and the closed chamber is provided. The temperature control element can be assembled in the vessel body after being manufactured outside the vessel body. Therefore, the processing vessel can be manufactured with improved efficiency and can be serviced by ordinary in-vessel maintenance operations.

9 Claims, 9 Drawing Sheets

PROCESSING VESSEL

This application is a continuation of application Ser. No. 08/356,536, filed Dec. 15, 1994 abandoned.

BACKGROUND OF THE INVENTION

1. Field of the Invention

This invention relates to a vessel used for a reaction vessel or an agitation vessel (hereinafter referred to as "processing vessel") in the field of chemical, petrochemical and food industries and, more particularly, to a processing vessel upon which a large thermal load is imposed during processing, or a processing vessel suitable for manufacturing such a product that heat-removing and heating powers are dominant factors of the productivity with which the product is produced.

2. Description of the Related Art

In general, a processing vessel of this kind is constructed in such a manner that a vessel body is formed as a pressure-proof closed vessel by welding dished end plates or the like to the opposite ends of a cylindrical barrel member, and a temperature control system for removing heat generated in the vessel or for heating a material contained in the vessel is provided in the vessel body.

Figure 10:
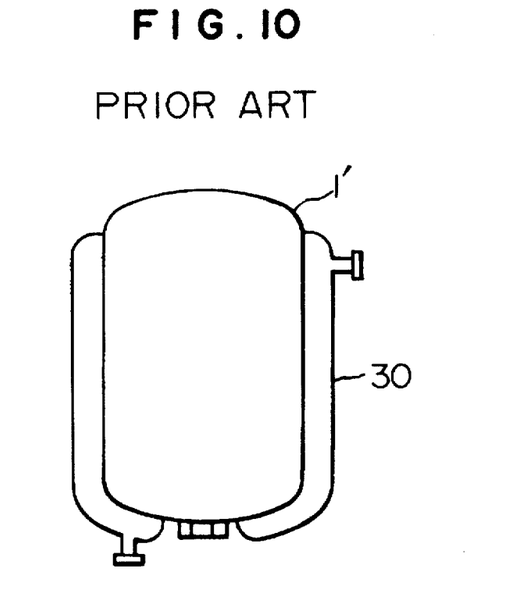
FIG. 10 is a longitudinal sectional view of a conventional processing vessel.
Figure 11:
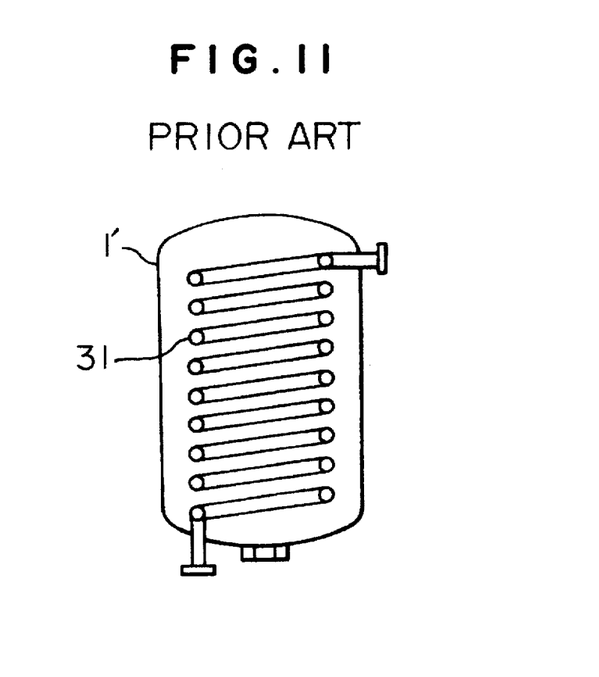
FIG. 11 is a longitudinal sectional view of another conventional processing vessel.
Figure 12:
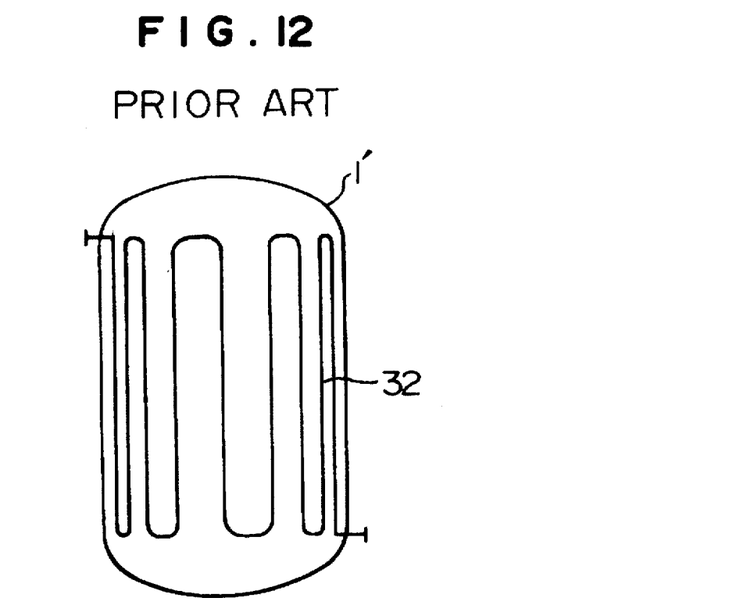
FIG. 12 is a longitudinal sectional view of still another conventional processing vessel.
Figure 13:
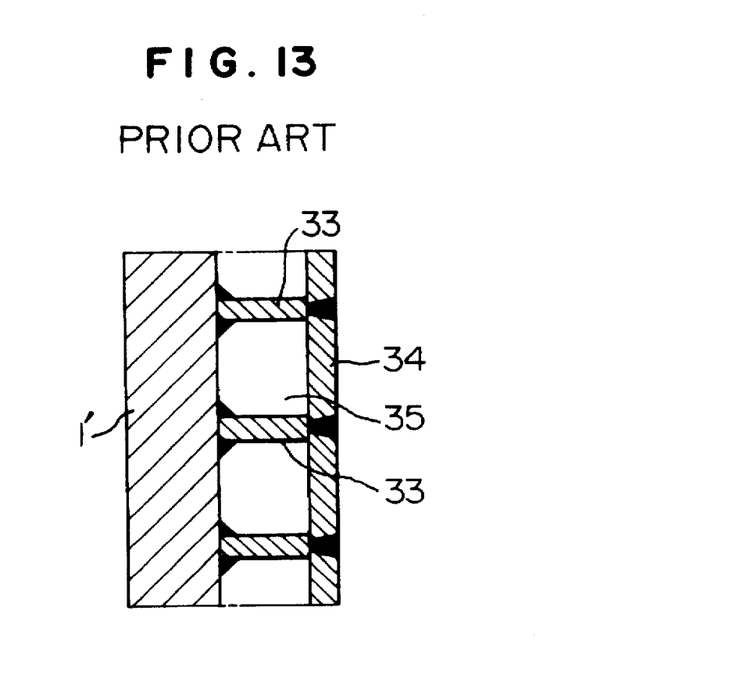
FIG. 13 is a longitudinal sectional view of a further conventional processing vessel.

As conventional heat removing systems for processing vessels, there have been known a jacket system, such as that shown in FIG. 10, in which a jacket 30 is annexed outside a vessel body 1', an inner pipe system, such as that shown in FIG. 11, in which a helical pipe 31 is fixedly disposed inside the internal surface of a vessel body 1', another inner pipe system, such as that shown in FIG. 12, in which a pipe 32 extending mainly along the longitudinal direction of a vessel body 1' inside the inner surface of the vessel body and having its ends elbow-connected is fixedly disposed by being meandered along the circumferential direction of the vessel body, an inner jacket system, such as that shown in FIG. 13, in which partition plates 33 are arranged at certain intervals perpendicularly to the inner surface of a vessel body 1', and inner strips 34 are disposed so as to extend between the inner ends of the partition plates 33, whereby a helical flow passage 35 is formed between the inner strips 34 and the inner surface of the vessel body 1' by being partitioned by the partition plates 33 (Japanese Patent Unexamined Publication No. 57-147502), and other types.

In the jacket system arranged for heat exchange through the wall of the vessel body as shown in FIG. 10, the thickness of the plate forming the vessel body is ordinarily increased in order to set a structural strength large enough to withstand the pressure generated in the vessel body and the jacket, so that the heat transfer rate is disadvantageously low. If the size of the vessel is increased, the thickness of vessel body wall must be increased to obtain the desired strength. Therefore, it is difficult to adapt this type of system to a large vessel.

In the inner pipe system arranged as shown in FIG. 12 or 13 for heat exchange through the wall of the pipe 31 or 32 inside the vessel body 1', the pipe thickness is determined by the pipe diameter, and the pipe diameter is small in comparison with the inside diameter of the vessel body 1'. Therefore, the pipe thickness is small and an improved heat transfer characteristic can be achieved. However, it is possible that contained materials will adhere to the pipe and a support for fixing the pipe to impede heat transfer, and that adhered materials will be mixed in a product, resulting in a reduction in the of the operating efficiency stability and a deterioration in product quality.

In the inner jacket system arranged as shown in FIG. 13 for heat exchange through the inner strips 34 inside the vessel body 1', the drawbacks of the systems of FIGS. 10 to 12 are removed. Also, the thickness of the inner strips 34 is small and an improved heat transfer characteristic can be achieved, because the thickness of the inner strips 34 is determined by the distance between the partition plates 33, and because the distance between the partition plates 33 is small in comparison with the inside diameter of the vessel body 1'. However, laborious operations are required as on site working for assembly inside the vessel to attach partition plates 33 to the inner surface of the vessel body 1' one by one and to thereafter attach inner strips 34 so as to connect the ends of the partition plates 33. Moreover, a multiplicity of welded portions between the inner strips 34 are exposed in the internal surface, and the surface of the welded portions needs smooth finishing. Thus, the manufacturing process is laborious and time-consuming.

Further, if the welded portions contact a corrosive solution, it is necessary to confirm the corroded state and to repair corroded portions if necessary. It is necessary to frequently perform maintenance operations.

SUMMARY OF THE INVENTION

In view of the problem of the above-described inner jacket system, an object of the present invention is to provide a processing vessel which is arranged so that the amount of operation for assembly in the vessel body 1 is remarkably reduced, operations for manufacturing a temperature control element and assembling the temperature control element in the vessel can be performed efficiently, and ordinary maintenance operations will suffice for maintenance of members in the vessel and, more particularly, to provide a processing vessel suitable for a kind of use in which removal of a large amount of heat and application of a large amount of heat are required with respect to heat of reaction (caused by exothermic reaction or endothermic reaction), or sensible heat and latent heat, or in which a high strength against pressure of a heat transfer member is required for operation under high pressure but it is desirable to avoid a reduction in heat transfer efficiency with an increase in the thickness of the member required to increase the strength against pressure.

According to the present invention, a temperature control element is formed which has at least one flow passage which is formed on an outer surface of an inner barrel formed of a plate, and through which a heating or cooling temperature control medium is caused to flow. The outside diameter of the temperature control element is smaller than the inside diameter of a processing vessel body. The temperature control element is disposed so as to face an inner surface of the vessel body.

A certain spacing is provided between the inner surface of the vessel body and the temperature control element fixed in the vessel body and having a temperature control medium flow passage. This spacing is shut off from the interior of the vessel to form a closed chamber. A pressure balancing system provides a communication between the interior of the closed chamber and the vessel body to equalize the pressures in the closed chamber and the vessel body. This construction generally characterizes the present invention.

A bottom portion of the temperature control element is formed into a conical shape and a shape defined by a circular arc in section, e.g., a semispherical shape, such that the diameter of the bottom portion is gradually reduced along a direction toward a processing vessel nozzle. An expansion portion for absorbing thermal stress is provided in fixing portions of the temperature control element to the vessel body or in the vessel body.

When the processing vessel is manufactured, the temperature control element can be set in the vessel body only by being positioned and fixed so that the desired spacing is formed between the temperature control element and the inner surface of the vessel body. The inner surface of the temperature control element is formed as a smooth cylindrical surface by curving a flat plate into a cylindrical shape without exposing a welded portion or the like. Therefore, it is not necessary to specially finish the inner surface.

During operation, a processing liquid in the vessel body undergoes heat exchange through the inner barrel constituting a part of the temperature control element with a heating medium or a cooling medium flowing in the flow passage. At this time, only equal pressures are applied to the two surfaces of the temperature control element on the inner barrel side and on the closed chamber side. Therefore, the thickness of the inner barrel can be reduced so that the resistance of heat transfer through the inner barrel is small, thereby improving the efficiency of heat exchange with the temperature control medium through the inner barrel.

Since the temperature control element is not brought into tight contact with the inner surface of the vessel body, manufacturing accuracy required of the temperature control element is not so high, and operations for assembling and mounting the temperature control element in the vessel body can be performed easily.

Further, a plurality of annular flow passages formed helically, for example, may be provided for the temperature control element. In such a case, the length of one flow passage wound around the outer circumferential surface of the inner barrel is reduced to ½ if the number of flow passages is two or to ⅓ if the number of flow passages is three. Also, if the sectional areas of the flow passages are equal to each other, the total flow passage sectional area is multiplied by the number of the separated flow passages. The period of time through which the temperature control medium stays in the temperature control element is thereby reduced, and temperature variations are also reduced. Accordingly, the heat exchange efficiency is improved and the pressure loss in the medium in the flow passages is small, so that the medium circulating pressure can be reduced.

Moreover, if plural helical annular flow passages are formed, the directions from the inlet to the outlet of the flow passages may be reversed relative to each other to make the heat distribution through the entire temperature control element uniform and to achieve uniform heat exchange with the content in the vessel body. It is also possible to cause flows of different temperature control mediums through the separated flow passages and, hence, to select optimal heat exchange conditions by utilizing different characteristics of the temperature control mediums.

Since the bottom portion of the temperature control element (inner barrel) may be formed by being tapered or reduced in diameter along a direction toward the processing vessel nozzle, the content in the vessel can be reliably discharged, and the facility with which a maintenance operation such as a cleaning operation is performed can be improved.

Since an expansion portion for absorbing thermal stress is provided in fixing portions of the temperature control element to the vessel body or in the vessel body, there is substantially no possibility of damage to the processing vessel by a thermal distortion or the like from the temperature control element due to the temperature control medium.

DESCRIPTION OF THE PREFERRED EMBODIMENTS

An embodiment of the present invention will be described with reference to FIGS. 1 and 2.

Figure 1:
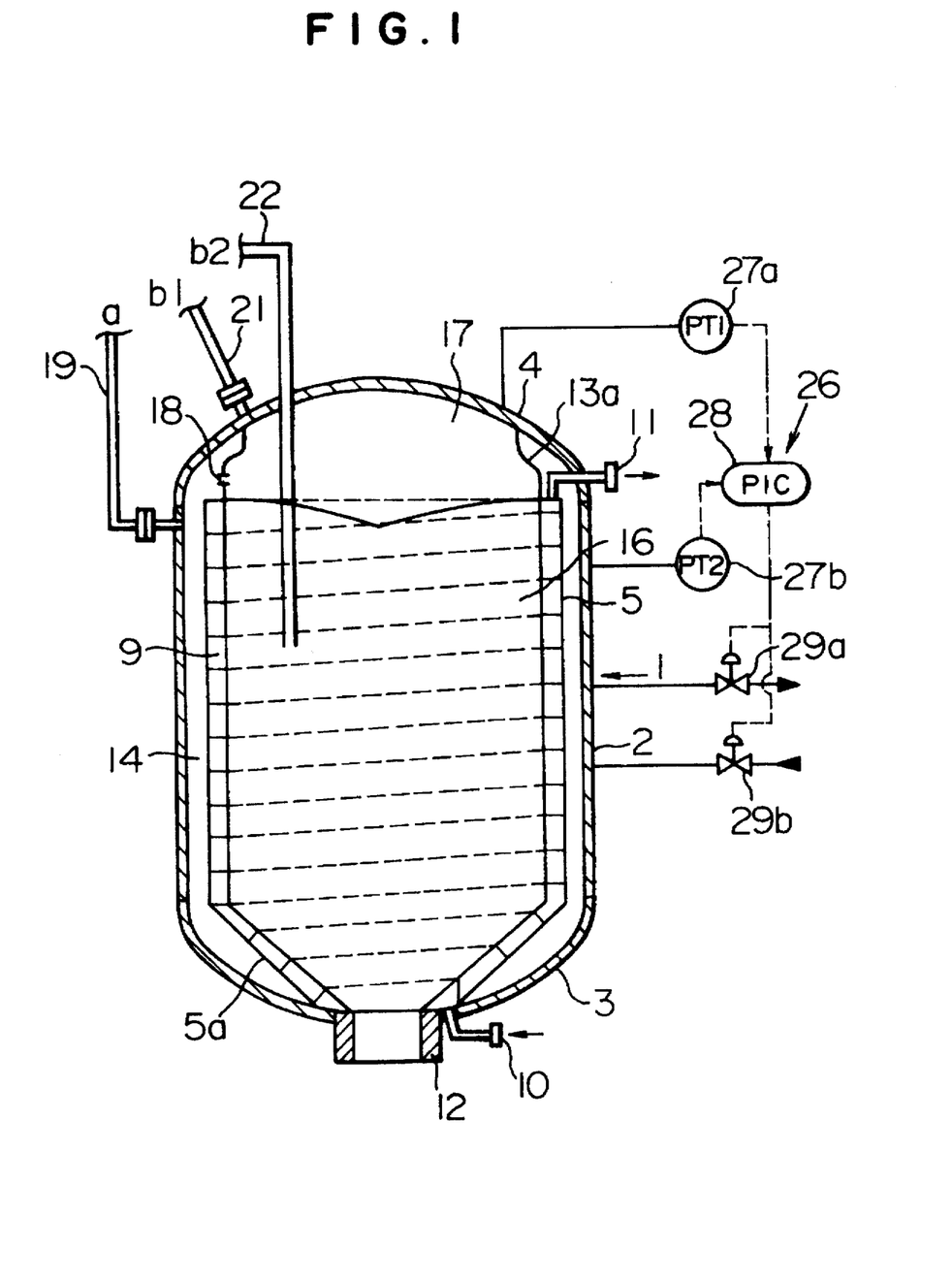
FIG. 1 is a longitudinal sectional view of an embodiment of the present invention.
Figure 2:
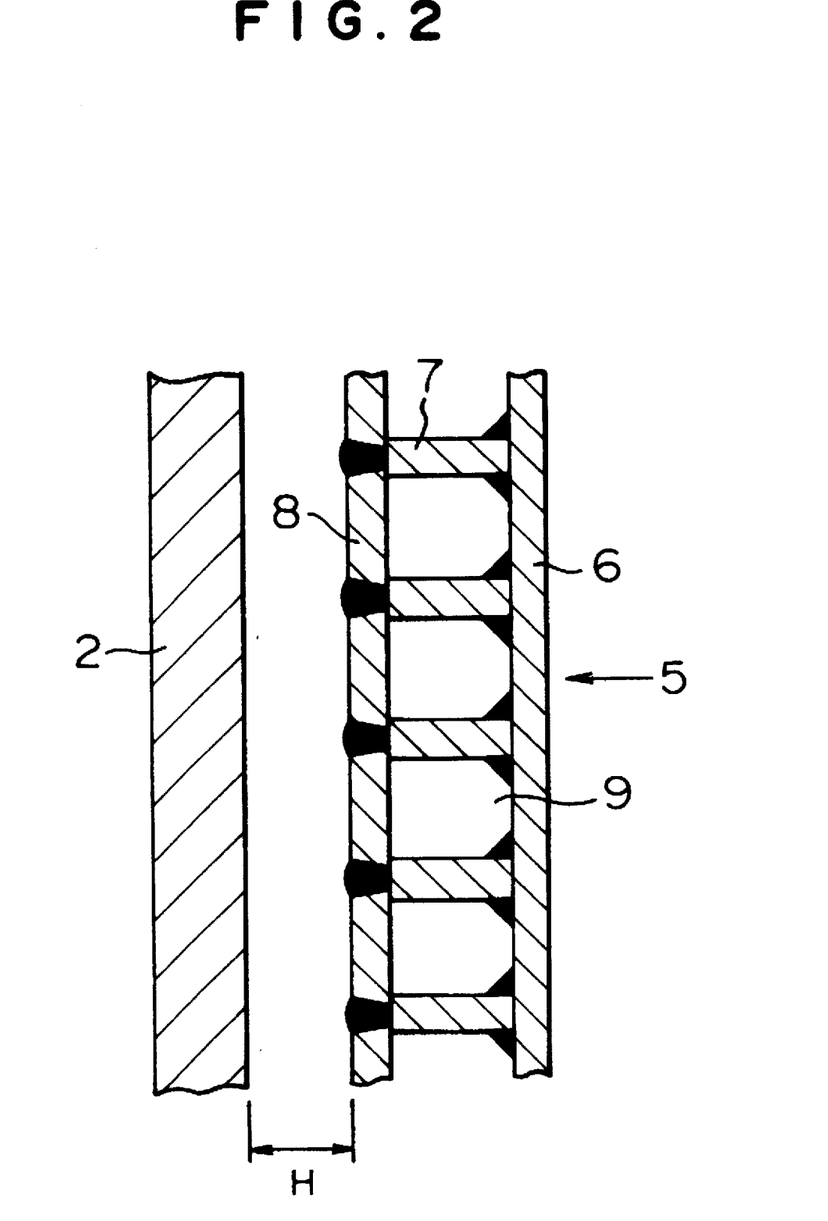
FIG. 2 is an enlarged diagram of an essential portion of FIG. 1.

FIG. 1 illustrates a processing vessel in which a helical flow passage is formed on an outer circumferential surface of a cylindrical inner barrel, and FIG. 2 is an enlarged sectional view of an essential portion of an example of a cross-sectional configuration of a flow passage. Referring to FIG. 1, end plates 3, 4 are welded to the opposite ends of a vessel body 1 to form a pressure-proof closed vessel. A temperature control element 5 is constructed in such a manner that partition plates are arranged at certain intervals on an outer surface of the cylindrical inner barrel 6 and welded to the same by fillet welding perpendicularly to the outer surface of the barrel, and outer strips 8 are welded by butt welding to the outer ends of the partition plates 7, i.e., the ends opposite from the inner barrel, each strip 8 connecting the opposite ends of one adjacent pair of the partition plates 7, thereby forming one helical flow passage 9 having a rectangular cross section.

Alternatively, flow passage 9 may be formed in such a manner that a pipe-like member previously formed is bent in accordance with the outside diameter of the inner barrel 6 and is fixed (welded) integrally with the inner barrel 6.

The cross-sectional shape of the flow passage 9 is not limited to a rectangular shape, and may be selected from any various shapes, e.g., a polygonal shape, a semicircular shape, a circular shape and the like.

Figure 7:
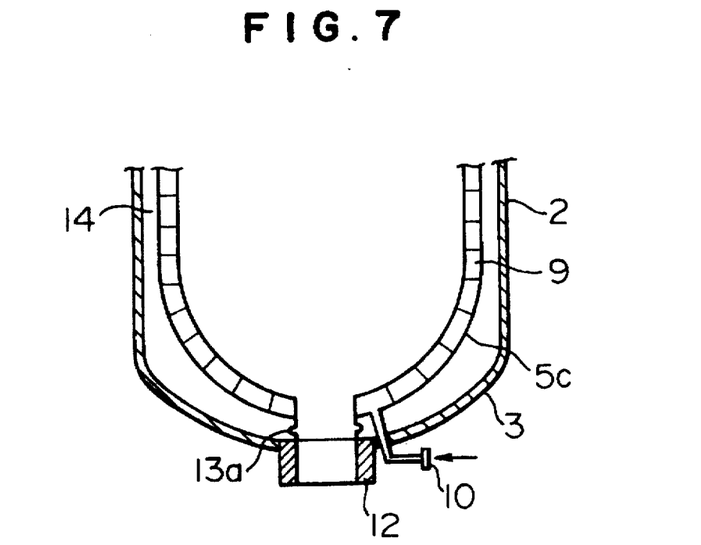
FIG. 7 is a longitudinal sectional view of another embodiment of the present invention, showing another example of the temperature control element bottom shape.

As shown in FIG. 1, a bottom portion of the temperature control element 6 (inner barrel 6) is formed into a conical shape 5a by being tapered toward a processing vessel nozzle 12 which is positioned at the lower end of the processing vessel 1. The shape of a lower end portion of the temperature control element 5 is not limited to the example illustrated in FIG. 1, and may be formed into a dish-like shape 5b, such as that shown in FIG. 3 or 4, having a circular arc in section in conformity with the bottom shape of the vessel body 1. The lower end portion can also be formed into a semispherical shape 5c having a circular arc in section, as shown in FIG. 7, or a semielliptical shape as viewed in section (not shown). That is, the shape of the bottom of the temperature control element 5 can be selected from various shapes according to the drainage efficiency, the shape of the vessel body and/or agitating blades provided in the vessel.

Figure 3:
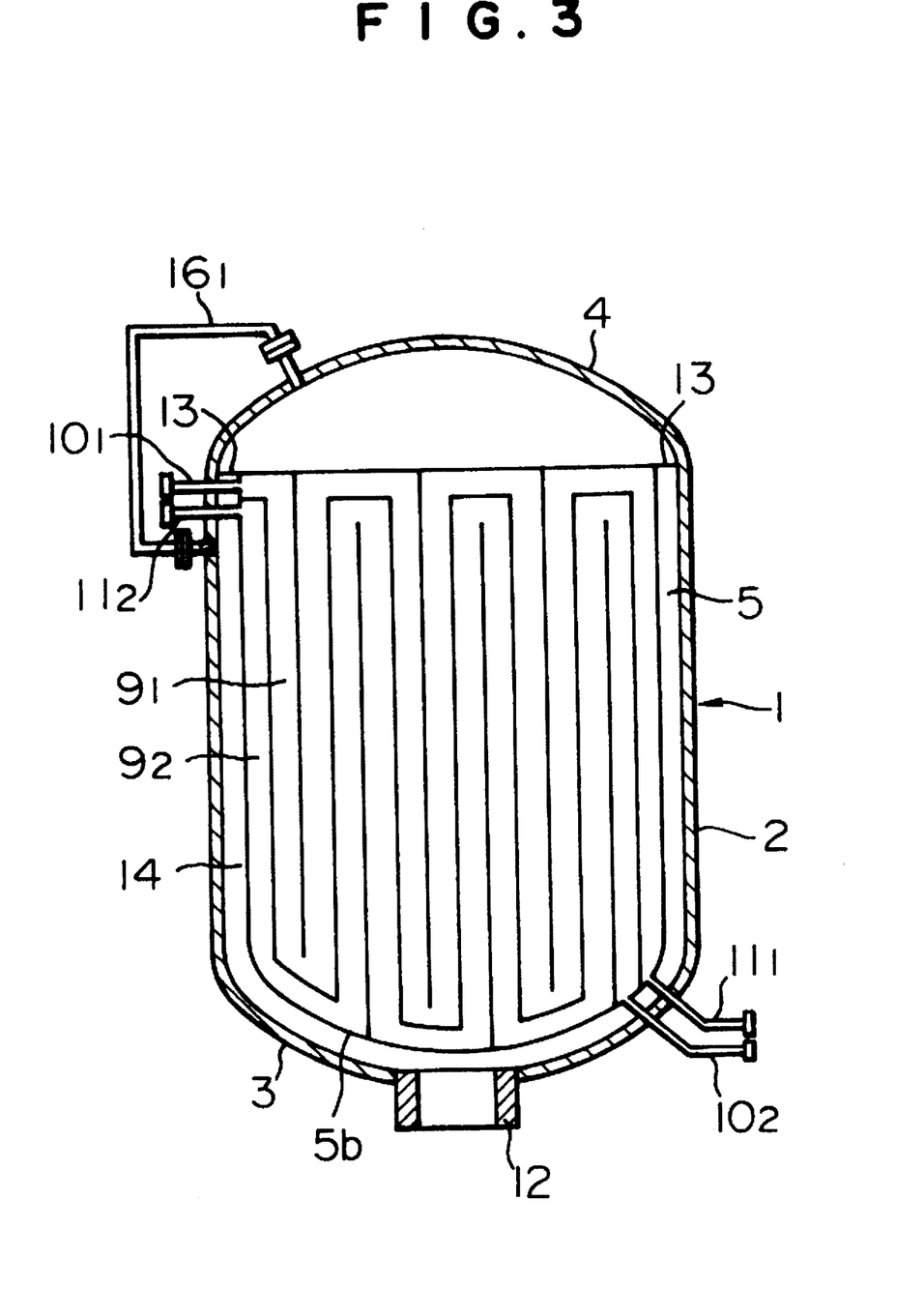
FIG. 3 is a schematic diagram of another example of the flow passage arrangement in accordance with the present invention.

A helical flow passage has been described as flow passage 9 of the temperature control element 5 with respect to the embodiment illustrated in FIG. 1. Alternatively, two or three flow passages extending helically in parallel with each other may be formed. Also, as illustrated in FIG. 3, two flow passages $9_1$, $9_2$ extending in parallel with each other may be formed around inner barrel 6 while being meandered or zigzagged along the vertical direction of vessel body 1. In such a case, as flow passages in temperature control element 5, a combination of two flow passage configurations may be formed in such a manner that flow passages $9_1$, $9_2$ are helically formed in the control element portion facing the lower dished end plate 3, as in the case of the arrangement illustrated in FIG. 1.

Figure 4:
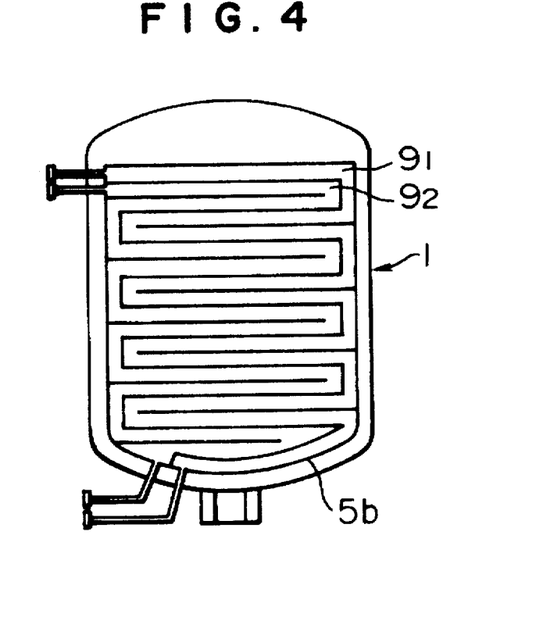
FIG. 4 is a schematic diagram of a still another example of the flow passage arrangement in accordance with the present invention.
Figure 5:
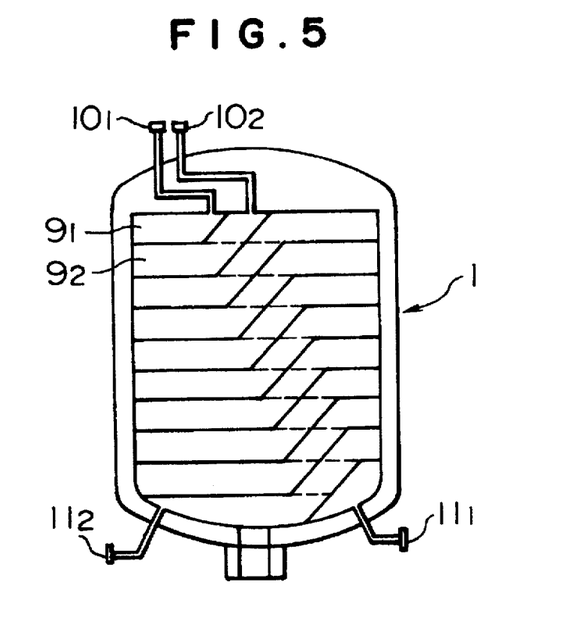
FIG. 5 is a schematic diagram of a further example of the flow passage arrangement in accordance with the present invention.
Figure 6:
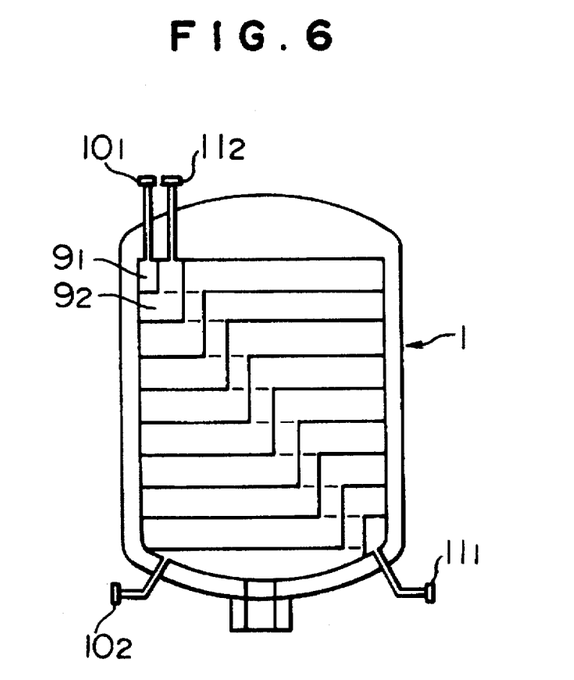
FIG. 6 is a schematic diagram of a further example of the flow passage arrangement in accordance with the present invention.

Further, as shown in FIG. 4, flow passages may be wound around inner barrel 6 along the circumferential direction from the top to the bottom or from bottom to the top while being meandered or zigzagged. The flow passage arrangement may also be such that, as shown in FIG. 5 or 6, flow passages $9_1$, $9_2$ wound in multiple layers around inner barrel 6 are connected by oblique flow passages (FIG. 5) or generally perpendicular flow passages (FIG. 6) by jumping one layer (if the number of flow passages is two) or n−1 layers (if the number of flow passages is three) according to the number of flow passages.

The above-described temperature control element 5 is previously manufactured separately from the vessel body 1, and is fixed by being inserted in the vessel body 1, as described below, with inlets $10_1$, $10_2$ and outlets $11_1$, $11_2$ of flow passages $9_1$, $9_2$ projecting outwardly through bottom and top portions, respectively, of the vessel body 1.

That is, the temperature control element 5 is so constructed that its outside diameter is smaller than the inside diameter of the vessel body 1. The temperature control element 5 is inserted in the cylindrical barrel 2 to which the lower dished end plate 3 is attached, and a lower end portion of the temperature control element 5 is fixed to the bottom dished end plate 3. At this time, a gap H is formed between the inner surface of the vessel body 1 and the outer surface of the temperature control element 5. The temperature control element 5 is disposed generally coaxially with the vessel body 1 so that this gap H is substantially uniform in the circumferential direction.

Then, inlet 10 or inlets $10_1$, $10_2$ and outlet 11 or outlets $11_1$, $11_2$ of flow passage 9 or flow passages $9_1$, $9_2$ are fitted and the top dished end plate 4 is attached to the cylindrical barrel 2.

The top-bottom relationship between the positions of inlet 10 or inlets $10_1$, $10_2$ and outlet 11 or outlets $11_1$, $11_2$ of flow passage 9 or flow passages $9_1$, $9_2$ may be reversed. If the number of flow passages is two or more, one inlet $10_1$ and one outlet $11_2$ may be disposed at the top or bottom, while the other inlet $10_2$ and outlet $11_1$ are disposed at the bottom or top.

The temperature control element 5 and the vessel body 1 are fixed to each other in such a manner that, as shown in FIG. 1, a lower end portion of the temperature control element 5 is directly connected to the bottom dished end plate 3 vessel body 1 while being brought close to the processing vessel nozzle 12, and an upper end portion of the temperature control element 5 is fixed to the top dished end plate 4 through an expansion portion 13a S-shaped in section. Alternatively, both upper and lower end portions of the temperature control element 5 may be fixed to the bottom and top dished end plates 3, 4 or to inner surfaces of the vessel body 1 through expansion portions 13a. Essentially, expansion portion 13a for absorbing thermal stress may be provided in a part of the connections between the temperature control element 5 and the vessel body 1 (including the bottom and top dished end plates 3, 4). Further, the arrangement may alternatively be such that the temperature control element 5 and the vessel body 1 are directly fixed without expansion portions 13a, while an expansion portion is provided in the vessel body 1.

Figure 8:
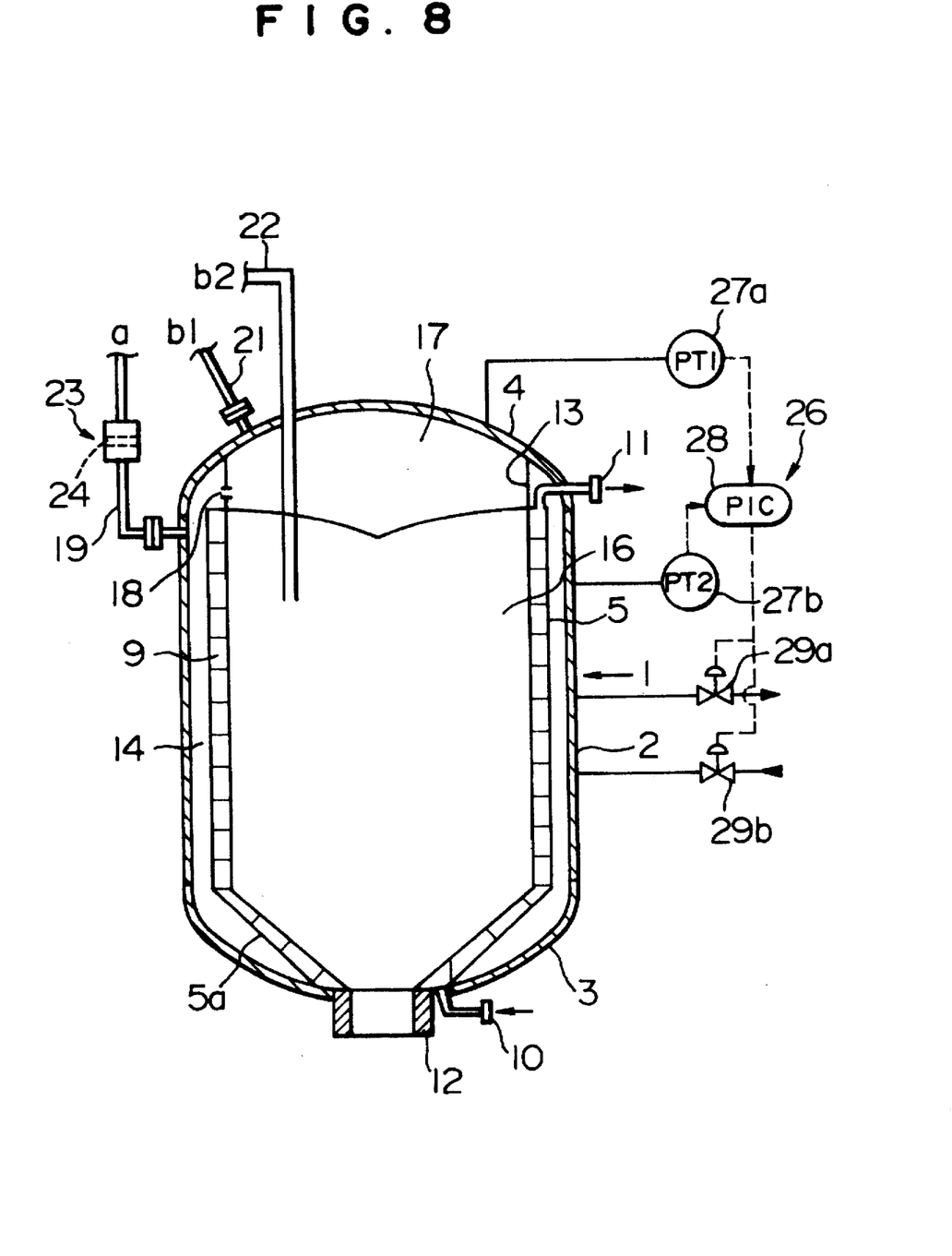
FIG. 8 is a longitudinal sectional view of a still another embodiment of the present invention.
Figure 9:
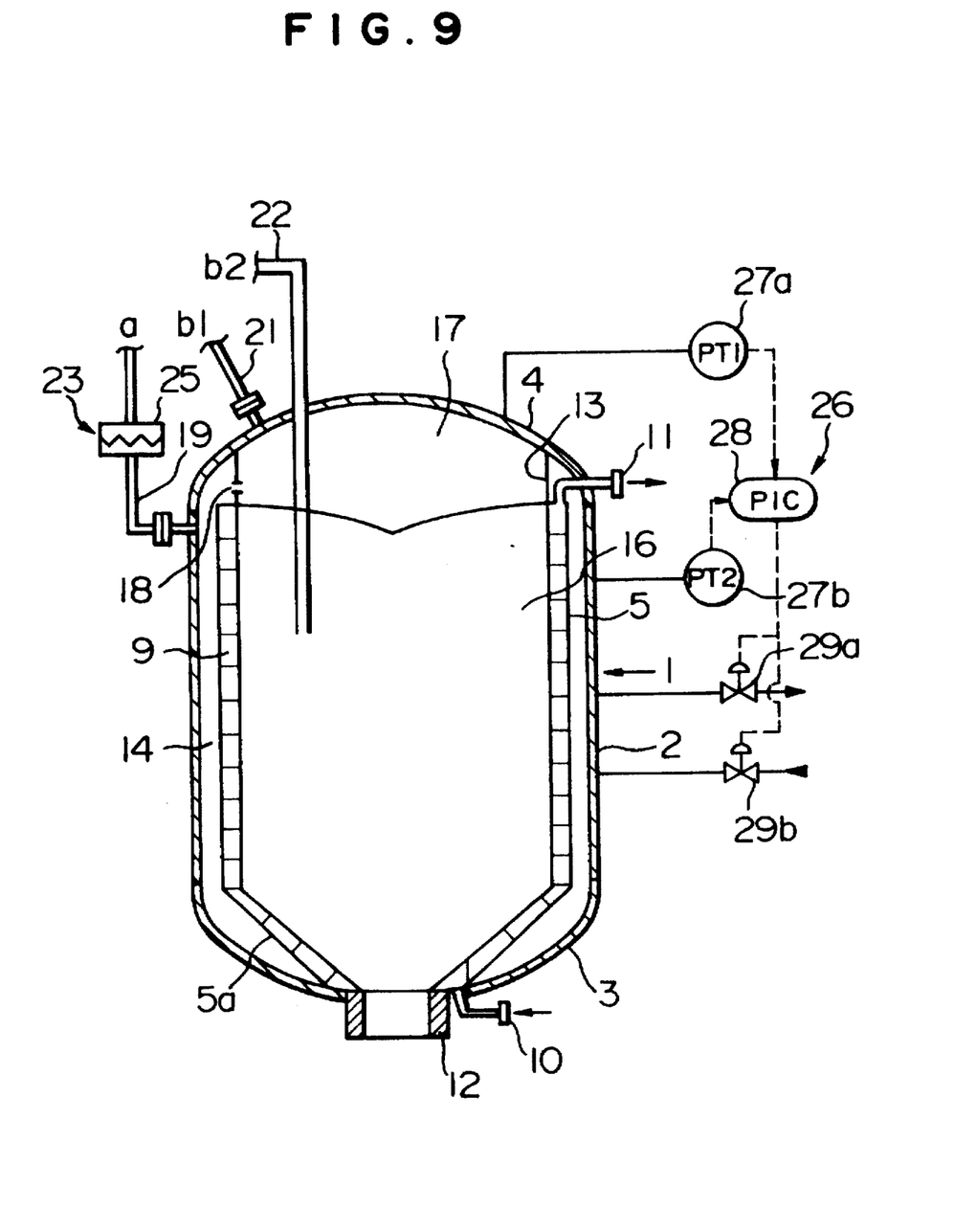
FIG. 9 is a longitudinal sectional view of a further embodiment of the present invention.

When the temperature element 5 is mounted in the vessel body 1 in the above-described manner, the space defined by the gap H between the inner surface of the vessel body 1 and the temperature control element 5 is formed as a closed chamber 14 separated from the interior of the vessel. Referring to FIGS. 1, 8, and 9, the inner barrel 6 contains a material (liquid phase) 16, and a gas phase is formed in an upper section of the inner barrel 6.

A system for pressure equalization between the closed chamber 14 and the inner barrel 6 will be described below.

If the contents in the closed chamber 14 and the inner barrel 6 can be mixed with each other without any problem, a simple communication means may be provided between the closed chamber 14 and the inner barrel 6.

That is, in the embodiments shown FIGS. 1, 8, and 9, a through hole 18 may be formed in a partition wall 13 or expansion portion 13a separating the interiors of the closed chamber 14 and the inner barrel 6 in a sealing manner around the upper gas phase section 17 to provide a communication between the closed chamber 14 and the inner barrel 6, thereby equalizing the pressures therein. Similarly, if a bottom portion of the temperature control element 5 is fixed to the bottom dished end late 3 through a partition wall in an alternative arrangement (not shown), and a through whole may be formed in the partition wall.

Further, as shown in FIG. 1, a communication may be provided between a piping having one end opened to the closed chamber 14, a piping 21 having one end opened to the gas phase section 17 in the inner barrel 6 or a piping 22 extending to the liquid phase section 16 in the inner barrel 6. That is, a communication may be provided between an end a of the piping 19 shown in FIG. 1 and at least one of ends $b_1$, $b_2$ of the pipings 21, 22 to equalize the pressures in the closed chamber 14 and the inner barrel 6.

The second embodiment of the present invention shown in FIG. 8, which is basically the same as the first embodiment shown in FIG. 1, and whose components identical to those of the first embodiment are indicated by the same reference characters, will be described mainly with respect to differences from the first embodiment.

In the embodiment shown in FIG. 1, a simple communication means is provided between the closed chamber 14 and the inner barrel 6, provided that mixing between the contents of the closed chamber 14 and the inner barrel 6 can be allowed. In contrast, in this embodiment, while the closed chamber 14 and the inner barrel 6 communicate substantially with each other, mixing between the contents thereof can be avoided.

A balancing piston type pressure balance mechanism 23 is provided in which a balancing piston 24 is provided in an intermediate portion of communication piping 19 having one end opened in the closed chamber 14. If a difference is caused between the pressures in the inner barrel 6 and the closed chamber 14, the pressures are automatically balanced by the movement of the balancing piston 24. That is, as in the case of the embodiment shown in FIG. 1, a communication is provided between the piping 19 having the balancing piston type pressure balance mechanism 23 having in its intermediate portion and the piping 21 having one end opened in the gas phase section 17 in the inner barrel 6 or the piping 22 extending to the liquid phase section 16 in the inner barrel 6. In other words, a communication is provided between the end a of the piping 19 and at least one of the ends $b_1$, $b_2$ of the pipings 21, 22.

At this time, since the balancing piston 24 maintains the interiors of the inner barrel 6 and the closed chamber 14 in a state of being shut off from each other, there is substantially no possibility of a gas or the like in the inner barrel 6 entering the closed chamber 14. Thus, it is possible to prevent mixing of foreign matters even in the case of processing various kinds of materials.

The embodiment shown in FIG. 9 represents another example of the arrangement of providing a substantial pressure communication between the closed chamber 14 and the inner barrel 6 while avoiding mixing of the contents thereof.

The embodiment shown in FIG. 9 differs from that shown in FIG. 8 only in that a diaphragm 25 is provided in place of the balancing piston type pressure balance mechanism 23 shown in FIG. 8.

That is, in the embodiment shown in FIG. 9, if a difference is caused between the pressures in the closed chamber 14 and the inner barrel 6, the pressure on the higher-pressure side is transmitted to the lower-pressure side through the diaphragm 25 so that the pressures in the closed chamber 14 and the inner barrel 6 are equalized, while communication of contents between the closed chamber 14 and the inner barrel 6 is prevented by the diaphragm 25.

The pressure balance mechanism 23 is not always necessary if the processing vessel 1 is used at normal pressure. Pressure balancing mechanism in accordance with the present invention is not limited to the above-described embodiments. For example, as shown in FIG. 1, 8, or 9, a pressure increasing/reducing system 26 may be provided. The pressure in the inner barrel 6 and the closed chamber 14 are detected by pressure detecting devices 27a, 27b, respectively, detection signals from the pressure detecting devices are supplied to a pressure designating/controlling device 28, and the pressure in the closed chamber 14 is reduced by operating a pressure control valve 29a if the pressure in the closed chamber 14 is higher than that in the inner barrel 6, or the pressure in the closed chamber 14 is increased by operating the pressure control valve 29a if the pressure in the closed chamber 14 is lower, thus controlling the pressures in the inner barrel 6 and the closed chamber 14 so that the pressures are equal or approximately equal to each other.

An agitator (not shown) can easily be provided in the processing vessel body 1 of the above-described embodiments. Needless to say, the heat transfer efficiency is further improved if an agitator is provided.

According to the present invention, the inner surface of the inner barrel 6 of the temperature control element 5 is formed as a smooth cylindrical surface by curving a flat plate into a cylindrical shape. Therefore, it is not necessary to specially finish the inner surface, and the amount of a processing liquid adhered to the inner surface is small, thus ensuring improved processing performance. Since the temperature control element is disposed with a constant spacing from the vessel body, a required manufacturing accuracy is not high, and the operation for attaching the element to the vessel body can be performed easily. Since substantially equal pressures are applied to the inner and outer surfaces of the temperature control element in the vessel, it is not necessary to increase the strength of the temperature control element for the maintenance of pressure in the vessel. Therefore, the thickness and weight of structural members of the temperature control element can be reduced, the efficiency of heat exchange through the inner barrel with a temperature control medium for heating or cooling can be improved. Thus, the present invention is very effective when applied to various chemical synthesis reaction vessels in which heat is developed.

The bottom portion of the temperature control element is formed by being tapered toward the processing vessel nozzle to enable the content in the vessel to be reliably discharged as well as to improve the facility with which the vessel is cleaned.

An expansion portion for absorbing a thermal stress is provided in the attachment portion between the temperature control element and the vessel body or in the vessel body to prevent a thermal stress from the temperature control element from badly influencing the vessel body.

Further, a plurality of flow passages are provided to enable plural kinds of temperature control mediums supplied to the temperature control element to be selected and to make it possible to select the temperature control medium flow direction. It is therefore possible to use an optimal combination of temperature control mediums as well as to uniformly heat the entire temperature control element. Also, if plural flow passages are formed, the total flow passage sectional area can be increased substantially largely and the flow passage length can be reduced. It is therefore possible to reduce pressure loss in the temperature control medium in the flow passage and the period of time through which the temperature control medium stays in the flow passage. As a result, the heat exchange efficiency can be improved and the heat distribution through entire vessel body can be made more uniform. As described above, in comparison with the conventional processing vessel, the processing vessel of the present invention can be manufactured at an improved efficiency and can be maintained more easily, and the operating efficiency and product qualities can be improved.

What is claimed is:

1. A processing vessel comprising:
    a vessel body having an inner wall and a discharge orifice at its lower end;
    a temperature control element disposed inside said vessel body comprising at least one flow passage through which a temperature control medium, for at least one of heating or cooling, is caused to flow, wherein said temperature control element defines an inner barrel in which a processing material is accommodated in heat exchange relation with said temperature control element;
    means for spatially fixing said temperature control element in said vessel body proximate to and spaced from said inner wall thereby defining an unfilled chamber between the temperature control element and the inner wall of said vessel body;

closure means for enclosing said chamber between said vessel body and said temperature control element thereby creating a closed chamber;

means for substantially preventing said processing material from entering said closed chamber: and means for openly communicating the interior of said inner barrel with said closed chamber, without communication with space exterior to said vessel, whereby the pressure in said inner barrel is substantially the same as the pressure in said closed chamber.

2. A processing vessel according to claim 1, wherein said at least one flow passage through which a temperature control medium is caused to flow is helically wound to conform to a circumferential surface of said inner barrel.

3. A processing vessel according to claim 1, wherein two flow passages are provided as said at least one flow passage, and temperature control mediums are caused to flow through the two flow passages in opposite directions.

4. A processing vessel according to claim 1, wherein said at least one temperature control medium flow passage comprises a plurality of flow passages through which different kinds of temperature control mediums are caused to flow.

5. A processing vessel according to claim 1, wherein said at least one temperature control medium flow passage is defined by said inner barrel, at least one helical partition plate connected to an outer surface of said inner barrel so as to extend perpendicularly from the surface, and at least one strip connected between portions of the helical outer end of said partition plate.

6. A processing vessel according to claim 1, wherein said temperature control element has a bottom portion having one of a conical shape and a shape defined by a circular arc in section, the diameter of the bottom potion having gradually reducing width along a direction toward the orifice at the lower end of said vessel body.

7. A processing vessel according to claim 1, wherein said temperature control element fixing means has an expansion portion capable of absorbing a thermal stress.

8. A processing vessel according to claim 1, further comprising communication means between the interiors of said inner barrel and said closed chamber, said communication means comprising a pressure transfer means having one of a balancing piston and diaphragm, whereby the pressures in said inner barrel and said closed chamber are made substantially equal to each other.

9. A processing vessel according to claim 1, further comprising:

a first detector for detecting the pressure in said inner barrel;

a second detector for detecting the pressure in said closed chamber;

a first pressure control valve for controlling the pressure in said inner barrel;

a second pressure control valve for controlling the pressure in said closed chamber; and a pressure designating and controlling means for controlling said first and second pressure control valves in response to detection signals from said first and second detectors so that the pressure in said inner barrel is substantially equal to the pressure in said closed chamber.

* * * * *